(12) United States Patent
Budampati et al.

(10) Patent No.: US 8,374,221 B2
(45) Date of Patent: Feb. 12, 2013

(54) APPARATUS AND METHOD FOR HYBRID DIVERSITY COMBINING AND ADAPTIVE BEAM FORMING IN INDUSTRIAL CONTROL AND AUTOMATION SYSTEMS

(75) Inventors: Ramakrishna S. Budampati, Maple Grove, MN (US); Arun V. Mahasenan, Trivandrum (IN); SrinivasaRao Katuri, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 526 days.

(21) Appl. No.: 12/471,177

(22) Filed: May 22, 2009

(65) Prior Publication Data

US 2010/0296552 A1 Nov. 25, 2010

(51) Int. Cl.
*H04B 1/00* (2006.01)
(52) U.S. Cl. ......................... 375/148; 375/150
(58) Field of Classification Search .................. 375/347, 375/130, E1.001; 455/67.11, 423, 522, 562.1, 455/561, 150; 370/342
See application file for complete search history.

(56) References Cited

U.S. PATENT DOCUMENTS

| | | | | |
|---|---|---|---|---|
| 6,052,405 A | * | 4/2000 | Nakano | 375/150 |
| 2004/0043794 A1 | * | 3/2004 | Nakaya et al. | 455/561 |
| 2008/0031307 A1 | * | 2/2008 | Fukuoka et al. | 375/130 |
| 2008/0045157 A1 | * | 2/2008 | Takahashi | 455/67.11 |
| 2008/0077976 A1 | * | 3/2008 | Schulz | 726/5 |

OTHER PUBLICATIONS

Do et al., Hybrid Diversity Combining techniques for DS-CDMA over a Multipath Fading Channel, 1997, J.C Baltzer AG, Science Publishers.*
Do et al., Hybrid Diversity Combining Techniques for DS0CDMA Over a Multipath Fading Channel, 1997,J.C Baltzer AG, Science Publishers.*
Muhammad Gufran Khan, Detection of Impulse Radio Ultra-Wideband signals Using Recursive Transmitted Reference Receivers, 2007, IEEE.*
Andrea Goldsmith, Wireless Communication, 2005, Cambridge University Press.*
Do et al., Hybrid Diversity Combining Technique for DS-CDMA Over a Multipath Fading Channel.*
Khan et al., Detection of Impulse Radio Ultra-Wideband Signals Using Recursive Transmitted Reference Receivers, 2007, IEEE.*
Andrea Goldsmith, Wireless Communications, 2005, Cambridge University Press.*
M.A. Do, et al., "Hybrid diversity combining techniques for DS-CDMA over a multipath fading channel", Wireless Networks 3 (1997), p. 155-158.
M. Oguz Sunay, et al., "Diversity Combining for DS CDMA Systems with Synchronization Errors", 1996 IEEE, p. 83-89.
Ning Kong, et al., "A Selection Combining Scheme for Rake Receivers", 1995 IEEE, p. 426-430.
S.A. Allpress, et al., "A Comparison of Maximal Ratio and Equal Gain Diversity Combining in Direct Sequence CDMA Future Mobile Communication Networks", Apr.-Dec. 1990, 5 pages.

\* cited by examiner

*Primary Examiner* — David C. Payne
*Assistant Examiner* — Wednel Cadeau

(57) ABSTRACT

An apparatus includes a plurality of antennas, where each antenna is configured to receive wireless signals transmitted using adaptive beam forming. The apparatus also includes a plurality of wireless radios, where each wireless radio is configured to output signals representing the wireless signals received by one of the antennas. The apparatus further includes a plurality of first diversity combiner units, where each first diversity combiner unit is configured to perform spread spectrum diversity combining using the signals output by one of the wireless radios. In addition, the apparatus includes a second diversity combiner unit configured to perform antenna diversity combining using signals output by the first diversity combiner units, where the second diversity combiner unit is configured to output recovered wireless signals.

20 Claims, 7 Drawing Sheets

APPARATUS AND METHOD FOR HYBRID DIVERSITY COMBINING AND ADAPTIVE BEAM FORMING IN INDUSTRIAL CONTROL AND AUTOMATION SYSTEMS

TECHNICAL FIELD

This disclosure relates generally to wireless communication systems. More specifically, this disclosure relates to an apparatus and method for hybrid diversity combining and adaptive beam forming in industrial control and automation systems.

BACKGROUND

Wireless communications in industrial facilities are often limited by severe fading. Fading is typically caused by different physical obstacles in the industrial facilities (such as plant structures and giant machines), as well as the mobility of personnel using wireless devices to communicate. One approach to providing better wireless communication service in an industrial facility is to deploy a larger number of wireless radios in a specified area, which obviously increases the cost and complexity of the overall system.

SUMMARY

This disclosure provides an apparatus and method for hybrid diversity combining and adaptive beam forming in industrial control and automation systems.

In a first embodiment, an apparatus includes a plurality of antennas, where each antenna is configured to receive wireless signals transmitted using adaptive beam forming. The apparatus also includes a plurality of wireless radios, where each wireless radio is configured to output signals representing the wireless signals received by one of the antennas. The apparatus further includes a plurality of first diversity combiner units, where each first diversity combiner unit is configured to perform spread spectrum diversity combining using the signals output by one of the wireless radios. In addition, the apparatus includes a second diversity combiner unit configured to perform antenna diversity combining using signals output by the first diversity combiner units, where the second diversity combiner unit is configured to output recovered wireless signals In a second embodiment, a method includes receiving wireless signals at a plurality of antennas, where the wireless signals are transmitted using adaptive beam forming. For each antenna, the method also includes (i) generating, in a plurality of signal branches, electrical signals representing the wireless signals received by that antenna and (ii) performing first diversity combining using the electrical signals in the signal branches associated with that antenna to produce a first output. The method further includes performing second diversity combining using the first output of each antenna to produce a second output, where the second output includes recovered wireless signals.

In a third embodiment, a system includes a transceiver configured to receive wireless signals transmitted using adaptive beam forming and to generate recovered wireless signals using hybrid diversity combining. The hybrid diversity combining includes spread spectrum diversity combining and antenna diversity combining. The system also includes a controller configured to process data based on the recovered wireless signals.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
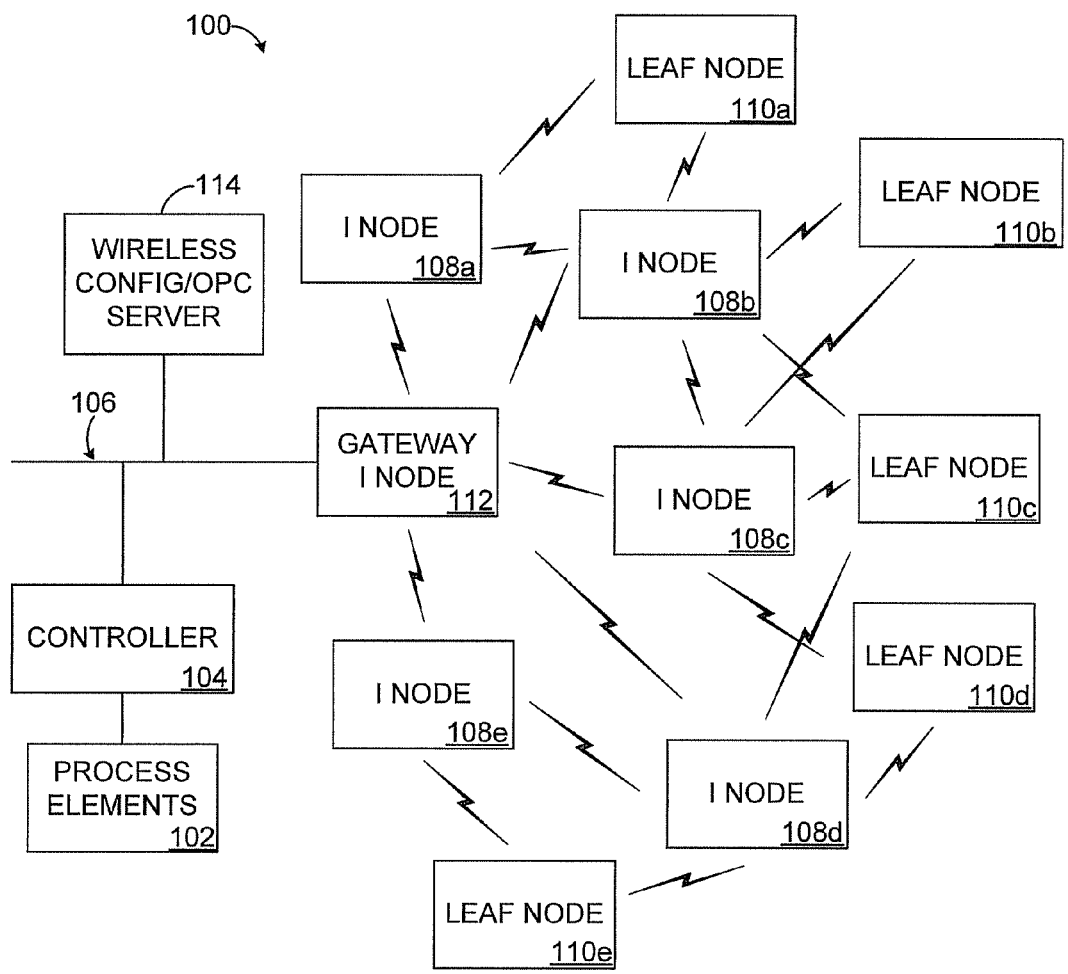
FIG. 1 illustrates an example industrial control and automation system according to this disclosure.

FIG. 1 illustrates an example industrial control and automation system 100 according to this disclosure. In this example embodiment, the industrial control and automation system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102 such as actuators, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system or any suitable real time operating system (RTOS).

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations.

In FIG. 1, the industrial control and automation system 100 also includes one or more wireless networks for communicating with wireless sensors or other devices. In this example, a wireless network includes infrastructure nodes ("I nodes") 108a-108e, leaf nodes 110a-110e, and a gateway infrastructure node 112.

The infrastructure nodes 108a-108e, 112 and the leaf nodes 110a-110e engage in wireless communications with each other. For example, the infrastructure nodes 108a-108e may receive data transmitted over the network 106 via the gateway infrastructure node 112 and wirelessly communicate the data to the leaf nodes 110a-110e. Similarly, the leaf nodes 110a-110e may wirelessly communicate data to the infrastructure nodes 108a-108e for forwarding to the network 106 via the gateway infrastructure node 112. In addition, the infrastructure nodes 108a-108e, 112 may wirelessly exchange data with one another. In this way, the infrastructure nodes 108a-108e, 112 form a wireless network capable of providing wireless coverage to leaf nodes and other devices in a specified area, such as a large industrial complex.

In this example, the nodes 108a-108e, 112 and 110a-110e are divided into infrastructure nodes and leaf nodes. The infrastructure nodes 108a-108e, 112 typically represent access point/routing devices that can store and forward messages for other devices. Infrastructure nodes 108a-108e, 112 are typically line-powered, meaning these nodes receive operating power from an external source. Infrastructure nodes 108a-108e, 112 are typically not limited in their operations since they need not minimize power consumption to increase the operational life of their internal power supplies. On the other hand, the leaf nodes 110a-110e are generally non-routing devices that do not store and forward messages for other devices. Leaf nodes 110a-110e typically represent devices powered by local power supplies, such as nodes that receive operating power from internal batteries or other internal power supplies. Leaf nodes 110a-110e are often more limited in their operations in order to help preserve the operational life of their power supplies.

The nodes 108a-108e, 110a-110e, 112 include any suitable structures facilitating wireless communications, such as radio frequency (RF) frequency-hopping spread spectrum (FHSS) or direct sequence spread spectrum (DSSS) transceivers. The nodes 108a-108e, 110a-110e, 112 could also include other functionality, such as functionality for generating or using data communicated over the wireless network. For example, the leaf nodes 110a-110e could represent wireless sensors used to measure various characteristics within an industrial facility. The sensors could collect and communicate sensor readings to the controller 104 via the wireless network. The leaf nodes 110a-110e could also represent actuators that receive control signals from the controller 104 and adjust the operation of the industrial facility. In this way, the leaf nodes may include or operate in a similar manner as the process elements 102 physically connected to the controller 104. The leaf nodes 110a-110e could further represent handheld user devices (such as INTELATRAC devices from HONEYWELL INTERNATIONAL INC.), mobile stations, programmable logic controllers, or any other or additional devices. The infrastructure nodes 108a-108e, 112 may also include any of the functionality of the leaf nodes 110a-110e or the controller 104.

The gateway infrastructure node 112 communicates wirelessly with, transmits data to, and receives data from one or more infrastructure nodes and possibly one or more leaf nodes. The gateway infrastructure node 112 may also convert data between protocol(s) used by the network 106 and protocol(s) used by the nodes 108a-108e and 110a-110e. For example, the gateway infrastructure node 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

A wireless configuration and OLE for Process Control (OPC) server 114 can configure and control various aspects of the industrial control and automation system 100. For example, the server 114 could configure the operation of the nodes 108a-108e, 110a-110e, and 112. The server 114 could also support security in the industrial control and automation system 100, such as by distributing cryptographic keys or other security data to various components in the industrial control and automation system 100 (like the nodes 108a-108e, 110a-110e, and 112). The server 114 includes any hardware, software, firmware, or combination thereof for configuring wireless networks and providing security information.

In particular embodiments, the various nodes in the wireless network of FIG. 1 form a mesh network communicating at 2.4 GHz or 5.8 GHz. Also, in particular embodiments, data can be injected into the wireless mesh network through the infrastructure nodes or leaf nodes, thus providing versatile, multifunctional, plant-wide coverage for wireless sensing, asset location tracking, personnel tracking, wireless communications, and any other or additional functionality as desired.

In one aspect of operation, various devices in the wireless network can use a hybrid diversity combining receiver to improve the reception of wireless signals in an industrial environment. Also, various devices in the wireless network can use adaptive beam forming to improve the transmission of wireless signals in the industrial environment. As a particular example, these techniques can be used in conjunction with IEEE 802.15.4 wireless radios for use in harsh environments like chemical plants. These features could be used, for instance, in the infrastructure nodes or the leaf nodes shown in FIG. 1. These features can help to improve the reliability of wireless communications, which can also help to improve the operational life of the devices (since fewer retransmissions may be needed). These features can also reduce the number of wireless radios in a specified area, which can reduce costs and further improve communication reliability.

Although FIG. 1 illustrates an example industrial control and automation system 100, various changes may be made to FIG. 1. For example, the industrial control and automation system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. Further, while the wireless network is illustrated in FIG. 1 as being used in conjunction with a wired controller 104 and wired process elements 102, one or more wireless networks could be used in a system without other wired control elements. In addition, FIG. 1 illustrates one example operational environment where hybrid diversity combining and transmit beam forming can be used. This functionality could be used in any other suitable system.

Figure 2:
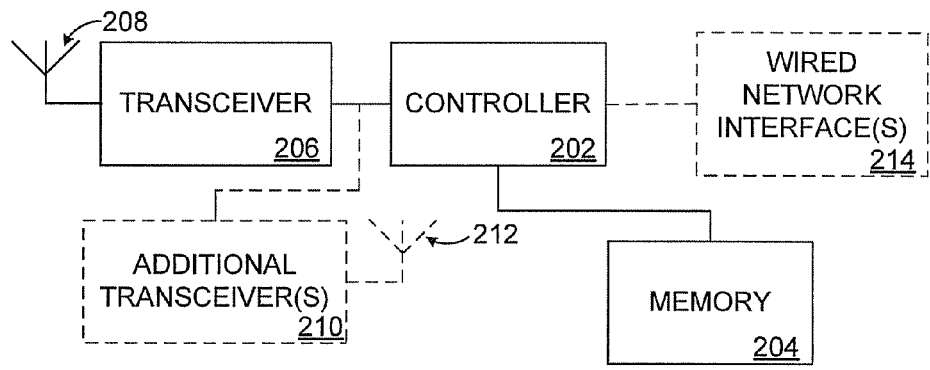
FIG. 2 illustrates an example wireless node in a wireless network according to this disclosure.

FIG. 2 illustrates an example wireless node 200 in a wireless network according to this disclosure. The wireless node 200 could, for example, represent a leaf node or an infrastructure node in the system 100 of FIG. 1. As shown in FIG. 2, the node 200 includes a controller 202, which controls the overall operation of the node 200. For example, the controller 202 may receive or generate data to be transmitted, and the controller 202 could provide the data to other component(s) in the node 200 for transmission over a wired or wireless network. The controller 202 could also receive data over a wired or wireless network and use or forward the data. As a particular example, the controller 202 in an infrastructure node could receive data transmitted wirelessly, determine a next hop for the data (if any), and provide the data for transmission to the next hop (if any). As another example, the controller 202 in a gateway infrastructure node could receive data from a wired network and provide the data for wireless transmission (or vice versa). The controller 202 includes any hardware, software, firmware, or combination thereof for controlling operation of a wireless node. As particular examples, the controller 202 could represent a processor, microprocessor, microcontroller, field programmable gate array, digital signal processor, or other processing or control device.

A memory 204 is coupled to the controller 202. The memory 204 stores any of a wide variety of information used, collected, or generated by the node 200. For example, the memory 204 could store information received over a network that is to be transmitted over the same or other network. The memory 204 includes any suitable volatile and/or non-volatile storage and retrieval device(s).

The node 200 also includes one or more wireless transceiver 206 coupled to one or more antennas 208. The transceiver(s) 206 and antenna(s) 208 can be used to communicate wirelessly with one or more leaf nodes and possibly one or more other infrastructure nodes. One or more additional transceivers 210 could also be used in the wireless node 200, such as to communicate with Wi-Fi or IEEE 802.11 devices (like wireless controllers or hand-held user devices) or other infrastructure or gateway infrastructure nodes. The additional transceiver(s) 210 may be coupled to one or more antennas 212 or share one or more common antennas (such as antenna(s) 208). As described in more detail below, one or more transceivers in a wireless node 200 can implement hybrid diversity combining for reception and/or transmit beam forming for transmission. Each transceiver includes any structure(s) for providing signals for wireless transmission and/or obtaining signals received wirelessly. Each antenna represents any structure(s) for transmitting and/or receiving wireless signals. In some embodiments, each transceiver represents an RF transceiver, such as an RF FHSS or DSSS transceiver. Also, each antenna could represent an RF antenna. It may be noted that any other suitable wireless signals could be used to communicate. In addition, each transceiver could include a transmitter and a separate receiver.

If the node 200 represents a gateway infrastructure node, the node 200 may further include one or more wired network interfaces 214. The wired network interfaces 214 allow the node 200 to communicate over one or more wired networks, such as the network 106. Each wired network interface 214 includes any suitable structure for transmitting and/or receiving signals over a wired network, such as an Ethernet interface.

Although FIG. 2 illustrates an example wireless node 200 in a wireless network, various changes may be made to FIG. 2. For example, various components in FIG. 2 could be combined, subdivided, or omitted and additional components could be added according to particular needs. Also, a "wireless node" represents any device that can transmit and/or receive data wirelessly, even if the "wireless node" has the ability to transmit and/or receive data over a wired connection as well.

FIGS. 3 through 6 illustrate example receivers using hybrid diversity combining according to this disclosure. These receivers could, for example, form part of a transceiver 206 or 210 in a wireless node 200, such as in a leaf node or an infrastructure node. As described below, these receivers combine spread spectrum diversity along with antenna diversity to improve wireless reception.

Figure 3:
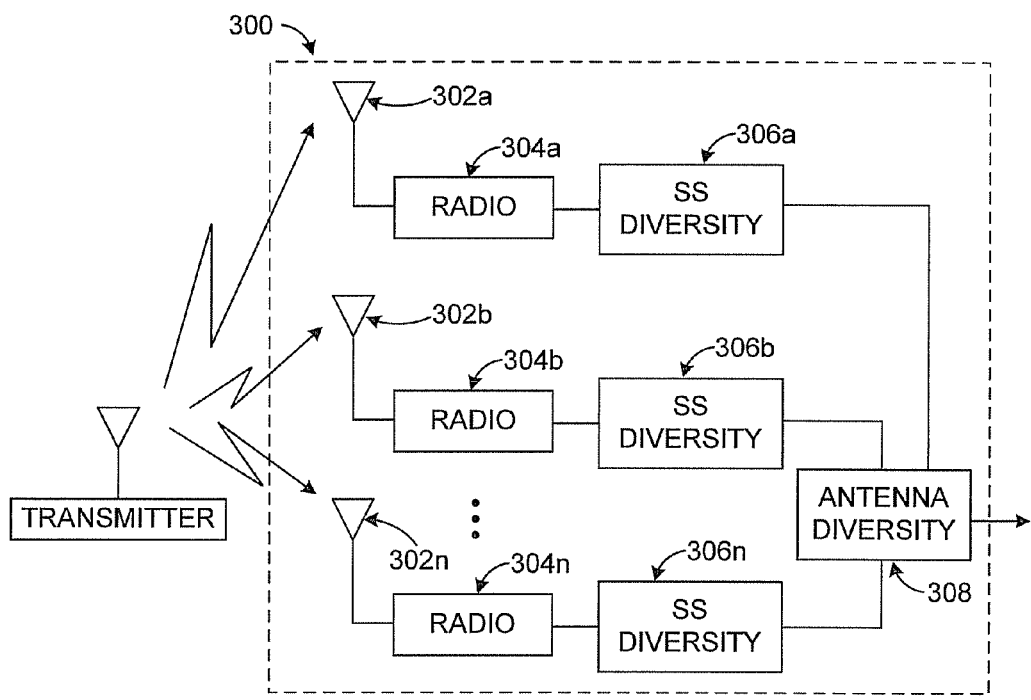
FIGS. 3 through 6 illustrate example receivers using hybrid diversity combining according to this disclosure.

As shown in FIG. 3, a receiver 300 includes or is coupled to multiple antennas 302a-302n (which could represent the antenna(s) 208 or 212 in FIG. 2). Each antenna is coupled to one of multiple wireless radios 304a-304n. The antennas produce electrical signals based on received wireless signals, and each wireless radio processes the electrical signals provided by its corresponding antenna. For example, the wireless radios 304a-304n could receive and down-convert RF signals into intermediate frequency (IF) or baseband signals. Each wireless radio 304a-304n includes any suitable structure for recovering data from received wireless signals.

Each of the wireless radios 304a-304n is coupled to one of multiple spread spectrum (SS) diversity units 306a-306n, which are themselves coupled to an antenna diversity unit 308. These diversity units perform a hybrid diversity combining function to enable more effective reception of wireless signals. In particular, the spread spectrum diversity units 306a-306n implement spread spectrum diversity combining for each of the antennas 302a-302n, such as by using RAKE reception. The antenna diversity unit 308 receives the outputs of the spread spectrum diversity units 306a-306n and implements spatial diversity combining to produce a recovered wireless signal. In this way, the receiver 300 implements multiple types of diversity combining, which can greatly improve communications in environments such as chemical plants or other industrial facilities.

In these embodiments, the receiver 300 includes multiple receiver front-ends (including the wireless radios 304a-304n) with spatially separated antennas 302a-302n. The antennas 302a-302n can be separated by adequate distances, such as distances greater than several wavelengths, to obtain uncorrelated multiple fading components. At each receiving antenna site, multiple independent diversity branches are obtained by resolving the selective channel paths with spread spectrum signaling. Since the reflections for components with an excess delay difference greater than a few hundred nanoseconds are often due to different physical structures, it may be assumed that they are uncorrelated. This inherent spread spectrum multipath diversity is owing to the wide band nature of the spread spectrum signal. In these embodiments, autocorrelation properties of code sequences used in spread spectrum communications are used to resolve multipath components to produce multiple spread spectrum outputs. Those multiple spread spectrum outputs are then combined by the antenna diversity unit 308.

This hybrid technique combines spread spectrum and spatial diversity to increase the received signal-to-noise ratio (SNR). In particular embodiments, this hybrid diversity combining can be implemented for DSSS systems (IEEE 802.15.4 radios) operating over frequency-selective channels with RAKE reception.

There are various techniques for combining multipath components, such as maximal ratio combining (MRC), equal gain combining (EGC), and selection combining (SC) (also known as selection diversity). As a result, there are various combinations of spread spectrum diversity combining and antenna diversity combining techniques that can be applied to achieve higher SNR. Some of these combinations can include spread spectrum diversity with MRC and antenna diversity with SC, spread spectrum diversity with SC and antenna diversity with MRC, MRC for both spread spectrum diversity and antenna diversity, and SC for both spread spectrum diversity and antenna diversity. These combining techniques can be applied to the antenna diversity and spread spectrum diversity units to exploit the combined effect of the two diversity techniques.

Figure 4:
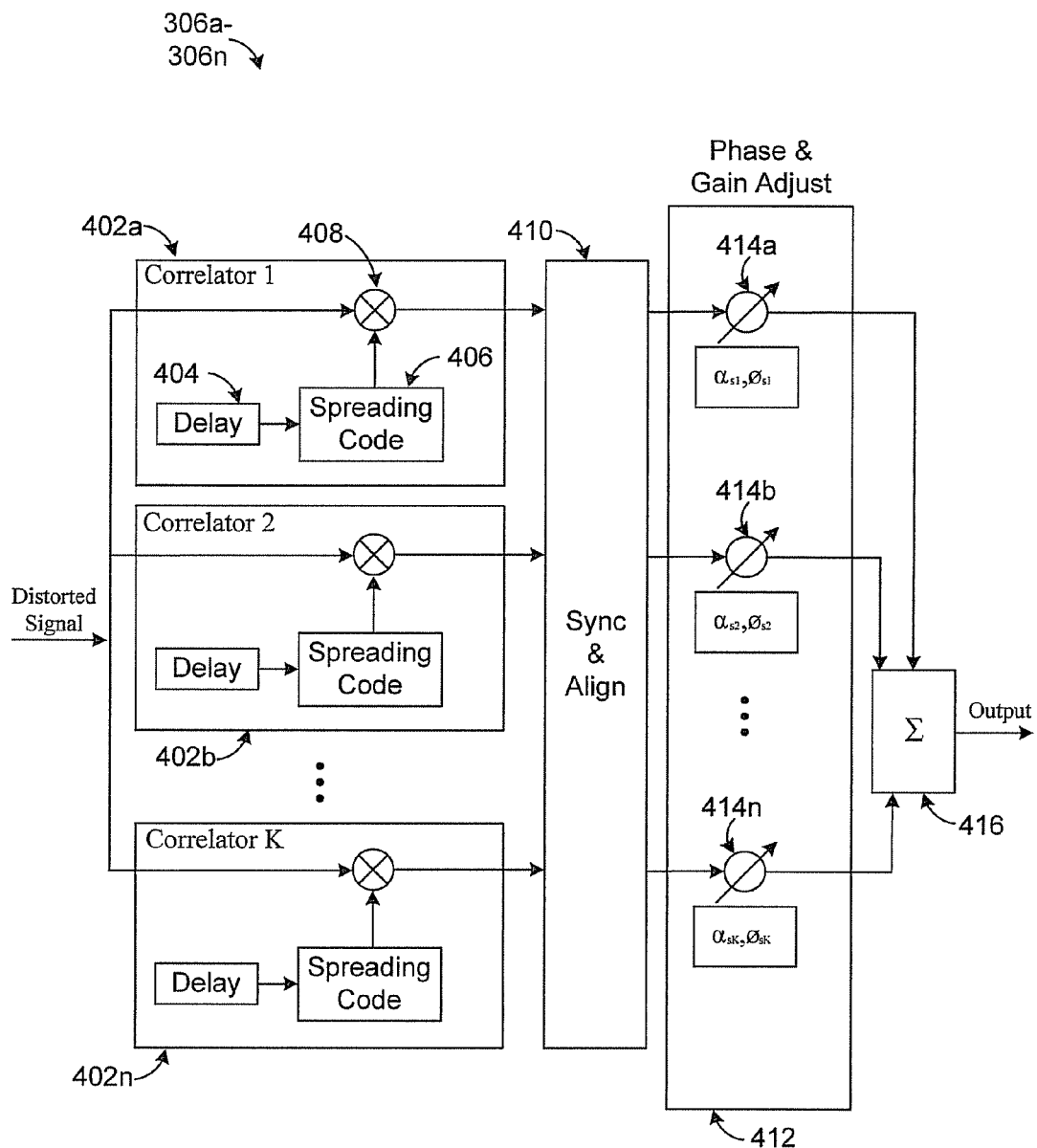

FIG. 4 illustrates an example embodiment of the spread spectrum diversity units 306a-306n. In this particular implementation, the spread spectrum diversity units 306a-306n represent RAKE receivers that can take advantage of the multipath propagation of wireless signals. If the time spread of the channel is greater than the time resolution of the system, different propagation paths can be separated, and the information extracted from each path can be used to increase the SNR of the received signal. The time spread of the channel is given by the maximum delay between the arrival of a transmitted signal on different propagation paths. The time resolution of the system is given by the inverse of the bandwidth of the radio frequency signal (or equivalently, by the chip period of the PN sequence).

In this example, each of the spread spectrum diversity units 306a-306n includes multiple correlators 402a-402n (forming multiple correlation arms). The correlators 402a-402n process received wireless signals and attempt to identify signals that arrive along different propagation paths. In this example, each of the correlators 402a-402n includes a delay unit 404, a spreading code storage unit 406, and a mixer 408. In operation, the delay units 404 in the correlators 402a-402n apply different delays to the mixing of the spreading code and received signals (to compensate for the variable multipath delay of the received wireless signals). This is useful because the correlation between two versions of the PN sequence delayed by one or more chips is almost zero, so the propagation paths are separable.

The outputs of the correlators 402a-402n are provided to a synchronization and alignment unit 410. The synchronization and alignment unit 410 is responsible for aligning the outputs of the correlators 402a-402n and synchronizing the outputs to a common time. The aligned and synchronized outputs are then passed to a phase and gain adjust unit 414, which can adjust the gains ($\alpha$) and phases ($\emptyset$) of the aligned and synchronized signals. The phases and/or gains can be adjusted based on MRC or EGC principles, or the fingers (correlation arms) of the spread spectrum diversity units 306a-306n can be selected based on SD principles. The adjusted signals are then summed in an accumulator 416 to produce the final output of the spread spectrum diversity unit. Each of the components 410-416 includes any suitable structure for performing the described function(s).

Figure 5:
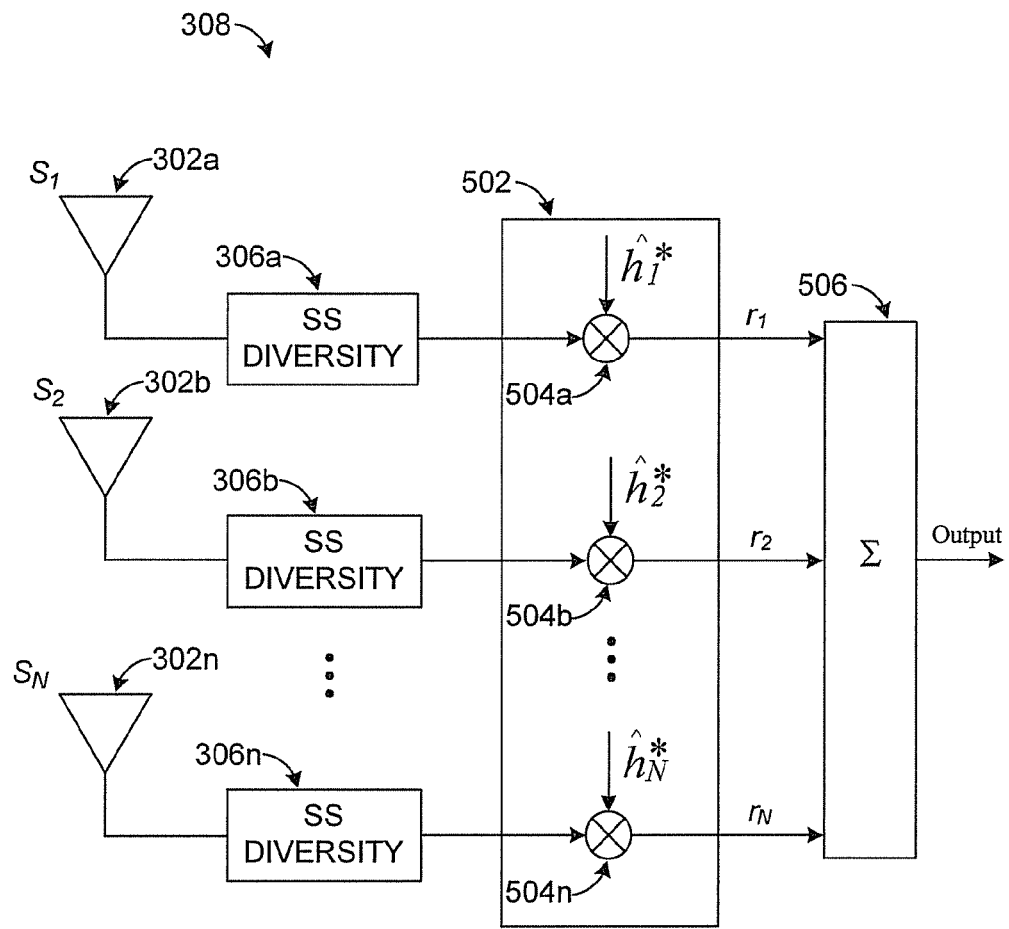

FIG. 5 illustrates an example embodiment of the antenna diversity unit 308. In this example, the antenna diversity unit 308 includes a channel adjust unit 502 having multiple mixers 504a-504n and an accumulator 506. The mixers 504a-504n receive the outputs produced by the spread spectrum diversity units 306a-306n and mix those outputs with channel estimates $\hat{h}^*_1$-$\hat{h}^*_N$. The channel estimates can be provided by any suitable source(s), such as a controller or other device within a transceiver or wireless node. The values produced by the mixers 504a-504n are then summed in the accumulator 506 to produce a final output, which in this case represents the data from wireless signals recovered using spread spectrum diversity combining and antenna diversity combining. Each of the components 502-506 includes any suitable structure for performing the described function(s).

Figure 6:
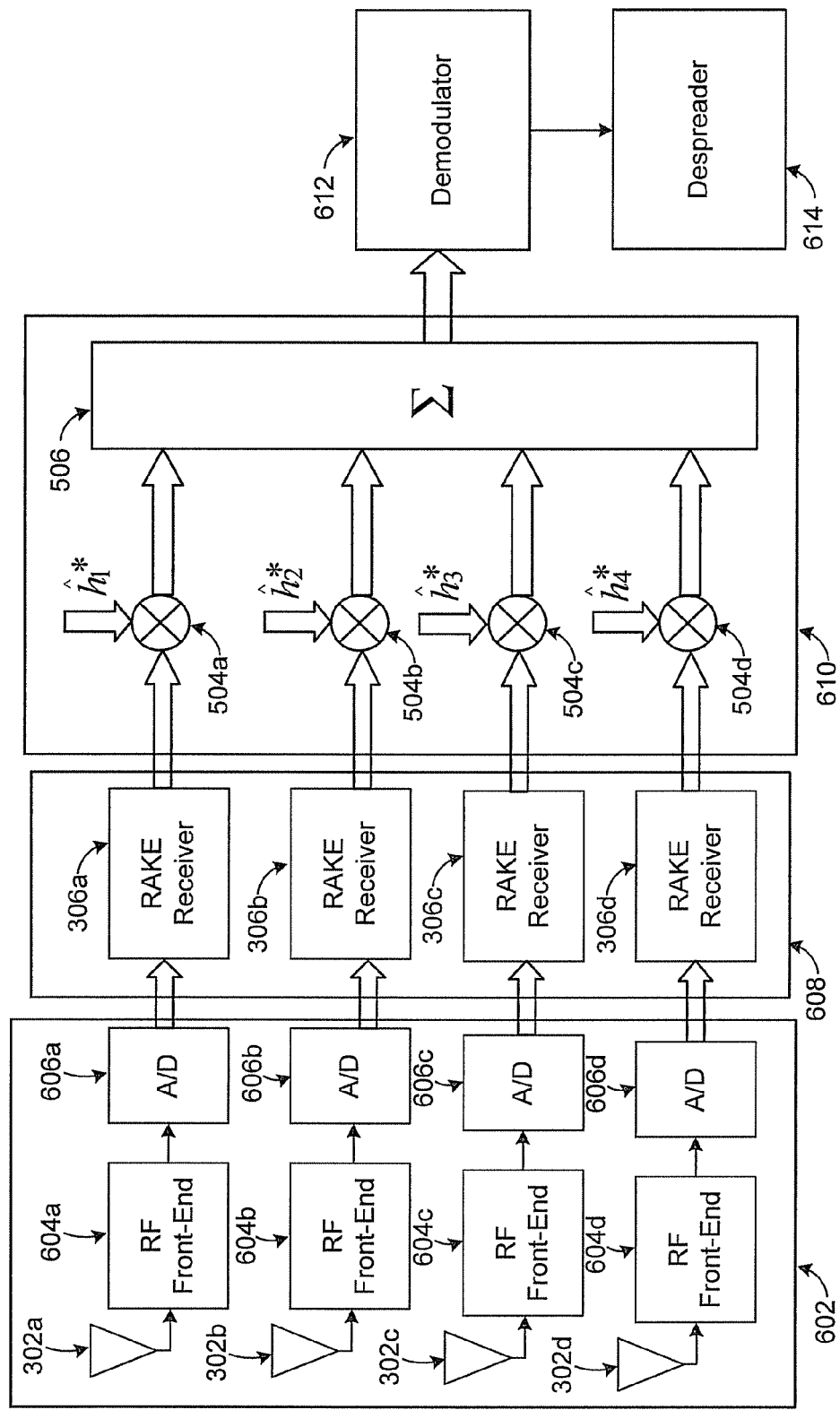

FIG. 6 illustrates an example receiver 600 that implements a specific type of hybrid diversity combining. As shown in FIG. 6, the receiver 600 includes an analog front-end 602, which includes the antennas 302a-302d, RF front-ends 604a-604d, and analog-to-digital converters (A/D) 604a-604d. The RF front-ends 604a-604d can receive and down-convert received RF signals, and the analog-to-digital converters 604a-604d digitize the down-converted signals.

The digitized signals from the front-end 602 are provided to a spread spectrum unit 608, which includes the spread spectrum diversity units 306a-306n (implemented here using RAKE receivers with MRC, EGC, or SD) that perform spread spectrum diversity combining. The outputs of the spread spectrum diversity units 306a-306n are provided to an antenna unit 610, which implements antenna diversity combining using the mixers 504a-504d and the accumulator 506. The output of the accumulator 506 is provided to a demodulator 612, which demodulates the received signal. A despreader 614 despreads the demodulated signal, such as by multiplying the demodulated signal using a known despreading sequence (such as when DSSS is used).

As noted above, there are a wide variety of combinations that can be used in hybrid diversity combining. For example, spread spectrum diversity using MRC can be combined with antenna diversity using SC. Here, multiple signal branches at each antenna (containing electrical signals representing the received wireless signals) are combined with a maximal ratio at that antenna site, and the antenna with the maximum bit SNR can be selected and its output processed to yield the final output. As another example, spread spectrum diversity using SC can be combined with antenna diversity using MRC. Here, the signal branch with the largest SNR at each antenna is selected at the antenna site, and the signal branches from multiple selected antenna sites are combined with a maximal ratio to yield the final output. As a third example, MRC can be used with both spread spectrum diversity and antenna diversity. In this scheme, a total of K×N MRC diversity order can be obtained (where K represents the number of signal branches at each antenna site, and N represents the number of antenna sites). As a fourth example, SC can be used with both spread spectrum diversity and antenna diversity. In this scheme, the signal branch with the largest signal can be chosen at each antenna, and the best among the available signals can then be chosen.

Although FIGS. 3 through 6 illustrate example receivers using hybrid diversity combining, various changes may be made to FIGS. 3 through 6. For example, the functional division shown in each of these figures is for illustration only. Various components in these figures could be combined, subdivided, or omitted and additional components could be added according to particular needs. Also, as noted above, there are many combinations of spread spectrum diversity combining schemes and antenna diversity combining schemes that can be used in a receiver to implement hybrid diversity combining.

Figure 7:
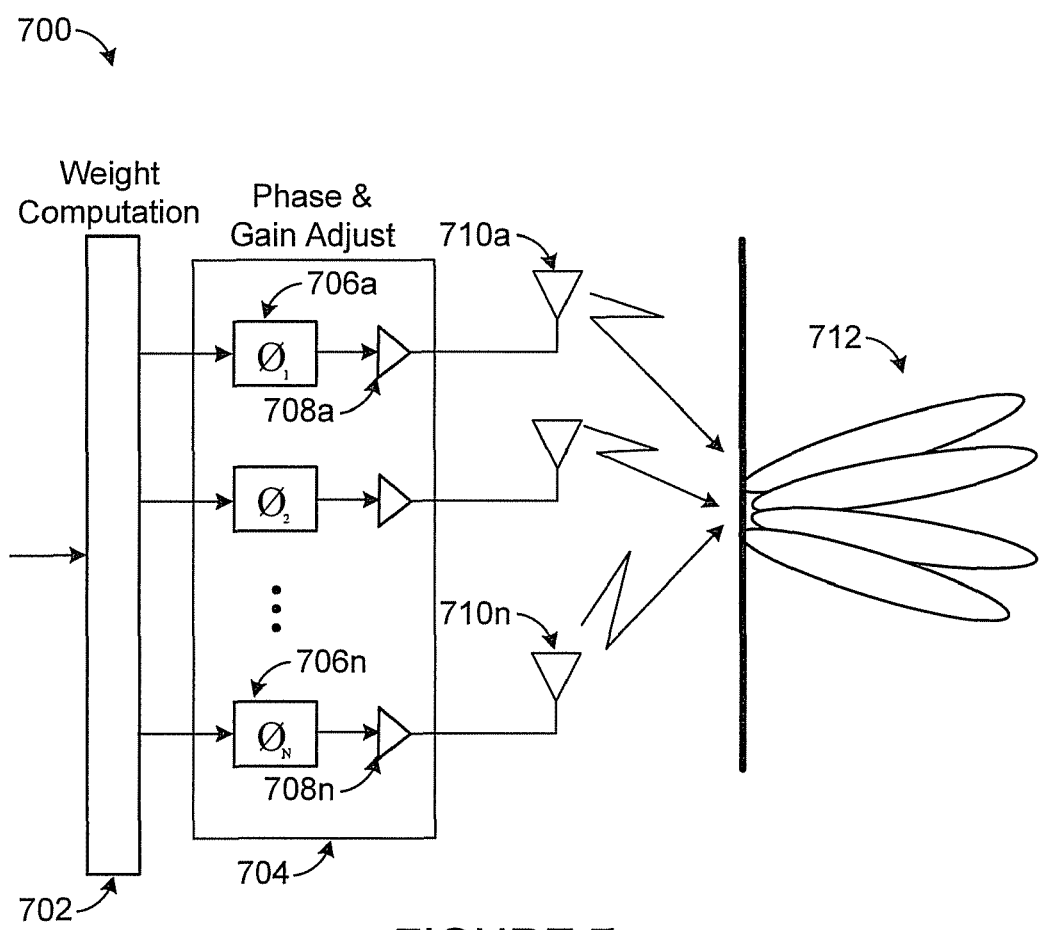
FIG. 7 illustrates an example transmitter using adaptive beam forming according to this disclosure.

FIG. 7 illustrates an example transmitter 700 using adaptive beam forming according to this disclosure. In this example, the transmitter 700 includes a weight computation unit 702, which receives data to be transmitted and estimates the weights needed to transmit the data. Here, the signals to be transmitted can be weighted, such as by using an adaptive signal processing algorithm like a Maximal-Ratio Transmission (MRT) scheme, to form a desired radiation pattern. The weights can be computed and adaptively updated in real time.

The signals and the weights are then passed to a phase and gain adjust unit 704, which includes phase adjusters 706a-706n and amplifiers 708a-708n. The phase adjusters 706a-706n can be used to adjust the phase of the data being transmitted, and the amplifiers 708a-708n amplify the signals containing the data to be transmitted. The amplified signals are provided to multiple antennas 710a-710n for transmission. A transmission pattern 712 is created based on the weightings calculated by the weight computation unit 702. Note that the antennas 710a-710n shown in FIG. 7 could be the same antennas 302a-302n shown in FIG. 3.

In order to obtain a beam-forming weight vector at a multiple-antenna transmitter, the frequency-selective fading channel coefficients can be estimated based on received signals. The received signals may be from a single-antenna or multiple-antenna node. For a single-antenna node, the channel estimation can be done as part of MRC diversity detection. For a multi-antenna node, a scheme that enables estimation of the resulting MIMO channel coefficients can be used. Note that, as a MIMO downlink channel is estimated from an uplink channel, the RF front-end of a multiple-antenna node can use the same relative phase shifts across all analog transmit chains that are used across the receive chains.

Having estimated the channel coefficients to some accuracy for the channel between the transmitter 700 and other nodes, a multi-antenna node can form its antenna beam in order to maximize the ratio between radiating power to a desired node and that to other (undesired) nodes. In this task, the weight computation unit 702 can use any suitable algorithm to compute such a beam-forming weight vector.

Although FIG. 7 illustrates an example transmitter 700 using adaptive beam forming, various changes may be made to FIG. 7. For example, the functional division shown in FIG. 7 is for illustration only. Various components in FIG. 7 could be combined, subdivided, or omitted and additional components could be added according to particular needs.

The hybrid diversity combining and adaptive beam forming techniques can be used individually or together in an industrial system to improve wireless communications. For example, diversity combining can improve the reliability of down-link communications from leaf nodes to infrastructure nodes. Also, multiple antennas used in receive front-ends can be used to perform transmit beam forming for up-link communications from infrastructure nodes to leaf nodes.

Among other things, these features can provide the following advantages, depending on the implementation. First, since the license-free spectrum is over-crowded, transmit beam forming can improve the spectral efficiency of the system by forming narrow transmit beams (such as for transmissions to leaf nodes). Also, hybrid diversity combining can provide diversity gain at the receiver in flat or selective fading scenarios, which helps to ensure reliable communications in fading channel conditions. Because of diversity gain, a transmitter may require normal transmission power in fading conditions, while lesser transmission power may be needed in conditions without fading. Moreover, transmit beam forming at one radio can help reduce interference with other radios. Further, efficient routing can be done using directional beams, and cooperative diversity can help in reducing the number of radios tin a specified area. In addition, a system employing these techniques can have reduced cost and complexity and improved reliability, power efficiency, and spectral efficiency.

Figure 8:
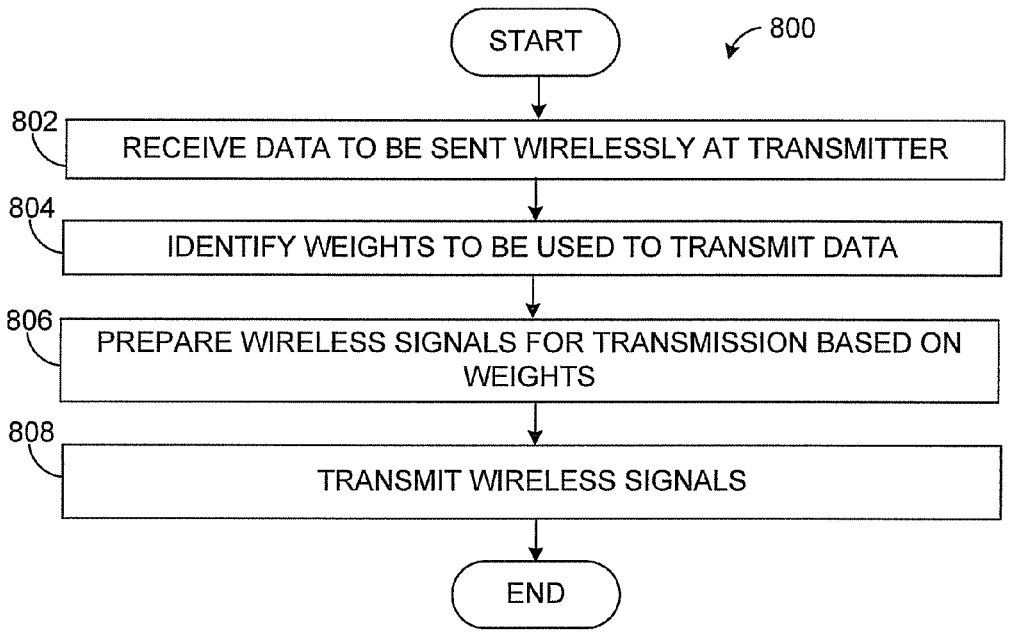
FIGS. 8 and 9 illustrate example methods for improved wireless communications in an industrial control and automation system according to this disclosure.
Figure 9:
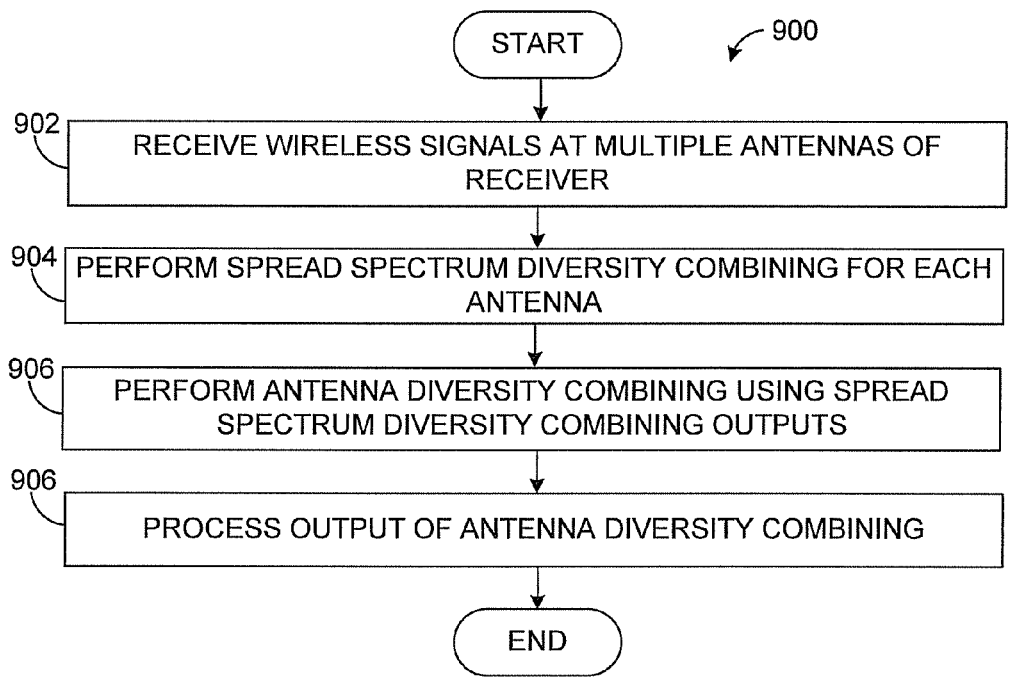

FIGS. 8 and 9 illustrate example methods for improved wireless communications in an industrial control and automation system according to this disclosure. As shown in FIG. 8, a method 800 for adaptive beam forming is described. Data to be transmitted wirelessly is received at a transmitter at step 802, and weights to be used to transmit the data are identified at step 804. This could include, for example, identifying weights to be used to direct wireless signals substantially towards a specified destination while reducing or minimizing the wireless signals sent towards other nodes. Wireless signals containing the data are then prepared for transmission based on the weights at step 806 and transmitted at step 808. This could include, for example, providing the desired level of amplification and phase shifting to the wireless signals based on the weights.

As shown in FIG. 9, a method 900 for hybrid diversity combining is described. Wireless signals are received at multiple antennas at step 902. The antennas may be spatially separated from one another by suitable distance(s). Spread spectrum diversity combining is performed for each antenna at step 904. This could include, for example, using multiple correlators and an accumulator in a RAKE receiver coupled to each antenna to process the received signals. The combining here could have any suitable form, such as maximal ratio combining, equal gain combining, or selection combining. Antenna diversity combining is performed using the outputs of the spread spectrum diversity combining at step 906. This could include, for example, using multiple mixers and an accumulator to provide spatial diversity combining. Again, the combining here could have any suitable form, such as maximal ratio combining, equal gain combining, or selection combining. The output of the antenna diversity combining is further processed at step 908. This could include, for example, demodulating and dispreading the output of the antenna diversity combining, although any other or additional processing steps could also be performed.

Although FIGS. 8 and 9 illustrate example methods for improved wireless communications in an industrial control and automation system, various changes may be made to FIGS. 8 and 9. For example, while each figure illustrates a series of steps, various steps in each figure could overlap, occur in parallel, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a plurality of antennas, each antenna configured to receive wireless signals transmitted using adaptive beam forming, each antenna further configured to receive wireless signals converted from Ethernet-formatted data from a gateway infrastructure node;
a plurality of wireless radios, each wireless radio configured to output signals representing the wireless signals received by one of the antennas, each wireless radio further configured to communicate in a mesh network;
a plurality of first diversity combiner units, each first diversity combiner unit configured to perform spread spectrum diversity combining using the signals output by one of the wireless radios and using at least one of: maximal ratio combining, equal gain combining, and selection combining;
a second diversity combiner unit configured to perform antenna diversity combining using signals output by the first diversity combiner units and using at least one of: maximal ratio combining, equal gain combining, and selection combining, the second diversity combiner unit configured to output recovered wireless signals; and
a controller configured to use one or more cryptographic keys from an OPC server to communicate with one or more external components in an industrial control and automation system;
wherein each of the first diversity combiner units comprises a RAKE receiver.

2. The apparatus of claim 1, further comprising:
a demodulator configured to demodulate the recovered wireless signals.

3. The apparatus of claim 1, wherein the apparatus comprises an access point in the industrial control and automation system.

4. A method comprising:
receiving wireless signals at a plurality of antennas, the wireless signals transmitted using adaptive beam forming, the wireless signals converted from Ethernet-formatted data and received from a gateway infrastructure node within a mesh network;
for each antenna:
generating, in a plurality of signal branches, electrical signals representing the wireless signals received by that antenna; and
performing first diversity combining using the electrical signals in the signal branches associated with that antenna to produce a first output, wherein the first diversity combining uses at least one of: maximal ratio combining, equal gain combining, and selection combining;
performing second diversity combining using the first output of each antenna to produce a second output, wherein the second diversity combining uses at least one of: maximal ratio combining, equal gain combining, and selection combining, the second output comprising recovered wireless signals; and
using one or more cryptographic keys from an OPC server to communicate with one or more external components in an industrial control and automation system;
wherein performing the first diversity combining comprises using a RAKE receiver with each antenna.

5. The method of claim 4, wherein performing the first diversity combining comprises using spread spectrum diversity combining.

6. The method of claim 4, wherein performing the second diversity combining comprises using antenna diversity combining.

7. The method of claim 4, further comprising:
using multiple wireless radios to process the received wireless signals and to generate the electrical signals in the signal branches.

8. The method of claim 4, further comprising:
demodulating the recovered wireless signals.

9. A system comprising:
a transceiver comprising:
a plurality of antennas, each antenna configured to receive wireless signals converted from Ethernet-formatted data and received from a gateway infrastructure node and transmitted using adaptive beam forming;
a plurality of wireless radios, each wireless radio configured to generate signals representing the wireless signals received by one of the antennas, each wireless radio further configured to communicate in a mesh network;
a plurality of first diversity combiner units, each first diversity combiner unit configured to perform spread spectrum diversity combining using at least one of: maximal ratio combining, equal gain combining, and selection combining; and
a second diversity combiner unit configured to perform antenna diversity combining using at least one of: maximal ratio combining, equal gain combining, and selection combining; and
a controller configured to process data based on recovered wireless signals, the controller also configured to use one or more cryptographic keys from an OPC server to communicate with one or more external components in an industrial control and automation system;
wherein each of the first diversity combiner units comprises a RAKE receiver.

10. The system of claim 9, wherein:
each first diversity combiner unit is configured to perform the spread spectrum diversity combining using the signals output by one of the wireless radios; and
the second diversity combiner unit is configured to perform the antenna diversity combining using signals output by the first diversity combiner units, the second diversity combiner unit configured to output the recovered wireless signals.

11. The system of claim 9, wherein the transceiver further comprises:
a demodulator configured to demodulate the recovered wireless signals; and
a despreader configured to despread the demodulated recovered wireless signals and to produce the data.

12. The system of claim 9, wherein:
the transceiver is configured to receive the wireless signals from a process controller in the industrial control and automation system; and the controller is configured to route the data towards at least one leaf node controlled by the process controller.

13. The apparatus of claim 1, wherein:

the antennas are configured to receive the wireless signals from a process controller in the industrial control and automation system; and the apparatus is further configured to route data recovered from the wireless signals towards at least one leaf node controlled by the process controller.

14. The apparatus of claim 1, wherein each wireless radio is configured to communicate in the mesh network at 2.4 GHz or 5.8 GHz.

15. The method of claim 4, wherein:

the antennas receive the wireless signals from a process controller in the industrial control and automation system; and the method further includes routing data recovered from the wireless signals towards at least one leaf node controlled by the process controller.

16. The apparatus of claim 1, wherein the antennas are spatially separated from one another.

17. The method of claim 4, wherein the antennas are spatially separated from one another.

18. The system of claim 9, wherein the antennas are spatially separated from one another.

19. The apparatus of claim 1, wherein the wireless radios comprise one of: radio frequency (RF) frequency-hopping spread spectrum (FHSS) transceivers and direct sequence spread spectrum (DSSS) transceivers.

20. The system of claim 9, wherein the wireless radios comprise one of: radio frequency (RF) frequency-hopping spread spectrum (FHSS) transceivers and direct sequence spread spectrum (DSSS) transceivers.

* * * * *